US011342809B2

United States Patent
Matsunaga et al.

(10) Patent No.: US 11,342,809 B2
(45) Date of Patent: May 24, 2022

(54) ROTATING ELECTRIC MACHINE

(71) Applicant: Mitsubishi Electric Corporation, Tokyo (JP)

(72) Inventors: Toshihiro Matsunaga, Tokyo (JP); Takashi Yamamoto, Tokyo (JP); Akira Kimishima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 16/640,121

(22) PCT Filed: Sep. 27, 2017

(86) PCT No.: PCT/JP2017/034950
§ 371 (c)(1),
(2) Date: Feb. 19, 2020

(87) PCT Pub. No.: WO2019/064376
PCT Pub. Date: Apr. 4, 2019

(65) Prior Publication Data
US 2021/0194314 A1    Jun. 24, 2021

(51) Int. Cl.
*H02K 5/24* (2006.01)
*H02K 1/18* (2006.01)
(Continued)

(52) U.S. Cl.
CPC ............ *H02K 5/24* (2013.01); *H02K 1/18* (2013.01); *H02K 1/185* (2013.01); *H02K 5/02* (2013.01); *H02K 15/14* (2013.01)

(58) Field of Classification Search
CPC ............ H02K 1/185; H02K 1/18; H02K 5/24; H02K 5/02; H02K 15/14
(Continued)

(56) References Cited

U.S. PATENT DOCUMENTS 5,873,710 A * 2/1999 Tucker ................ H02K 1/185
417/410.5
2001/0038797 A1* 11/2001 Makino .............. H02K 1/185
417/410.1
(Continued)

FOREIGN PATENT DOCUMENTS

DE    102008035896 A1 *  2/2010   ............. H02K 1/20
JP    47-23801 A    10/1972
(Continued)

OTHER PUBLICATIONS

DE-102008035896-A1 (English Translation) (Year: 2010).*
(Continued)

*Primary Examiner* — Quyen P Leung
*Assistant Examiner* — Alexander Moraza
(74) *Attorney, Agent, or Firm* — Sughrue Mion, PLLC; Richard C. Turner (57) ABSTRACT

To obtain a rotating electric machine capable of suppressing vibrations generated at the time of driving and achieving downsizing. The rotating electric machine includes: a rotor; a stator including a stator core provided on an outer side with respect to the rotor in a radial direction of the rotor; a motor frame, which includes a tubular portion provided on an outer side with respect to the stator core in the radial direction, and has the stator fixed thereto; and an intermediate member, which is provided on an outer peripheral surface of the stator core in the radial direction, and is held in a state of being press-fitted to an inner peripheral surface of the tubular portion in the radial direction, wherein a stiffness of the intermediate member per unit length is higher than a stiffness of the tubular portion per unit length.

6 Claims, 6 Drawing Sheets

(51) Int. Cl.
*H02K 5/02* (2006.01)
*H02K 15/14* (2006.01)

(58) Field of Classification Search
USPC ....... 310/216.118, 216.114, 51, 89, 433, 431
See application file for complete search history.

(56) References Cited

U.S. PATENT DOCUMENTS

| | | | |
|---|---|---|---|
| 2002/0135244 A1 | 9/2002 | Strong et al. | |
| 2006/0049713 A1* | 3/2006 | Toide | H02K 29/03 310/216.057 |
| 2007/0273241 A1 | 11/2007 | Niguchi et al. | |
| 2009/0212649 A1* | 8/2009 | Kingman | H02K 5/20 310/91 |
| 2013/0093273 A1* | 4/2013 | Murakami | H02K 9/22 310/64 |
| 2013/0222946 A1* | 8/2013 | Nagai | G11B 19/2018 360/97.19 |
| 2014/0145548 A1* | 5/2014 | Asao | H02K 5/06 310/216.114 |

FOREIGN PATENT DOCUMENTS

| | | |
|---|---|---|
| JP | 2010-233328 A | 10/2010 |
| JP | 2010233328 A * | 10/2010 |
| JP | 4602329 B2 | 12/2010 |
| JP | 5037256 B2 | 9/2012 |
| JP | 2016-140147 A | 8/2016 |
| WO | 2005/097653 A1 | 10/2005 |

OTHER PUBLICATIONS

JP-2010233328-A (English Translation) (Year: 2010).*
Roof Tiles: The Complete Guide to Tile Roofing (https://www.restoremastersllc.com/commercial-roofing/roof-tiles/) (Year: 2020).*
Communication dated Aug. 25, 2020, from the European Patent Office in application No. 17926825.5.
International Search Report for PCT/JP2017/034950 dated Dec. 12, 2017 (PCT/ISA/210).

* cited by examiner

ROTATING ELECTRIC MACHINE

This application is a National Stage of International Application No. PCT/JP2017/034950 filed Sep. 27, 2017.

TECHNICAL FIELD

The present invention relates to a rotating electric machine in which a stator is provided on an outer side with respect to a rotor in a radial direction.

BACKGROUND ART

There has hitherto been known a rotating electric machine including: a rotor; a stator provided on an outer side with respect to the rotor in a radial direction of the rotor; and a motor frame, which includes a tubular portion provided on an outer side with respect to the stator in the radial direction of the rotor, and has the stator fixed thereto. This rotating electric machine further includes an intermediate member, which is provided on an outer peripheral surface of the stator, and is press-fitted to an inner peripheral surface of the tubular portion of the motor frame. With the intermediate member being press-fitted to the inner peripheral surface of the tubular portion of the motor frame, a tightening force exerted on a stator core in the radial direction is improved. With this, vibrations generated in the rotating electric machine at the time of driving of the rotating electric machine can be suppressed (for example, see Patent Literature 1).

CITATION LIST

Patent Literature

[PTL 1] JP 4602329 B2

SUMMARY OF INVENTION

Technical Problem

However, there has been a problem in that, with the intermediate member provided between the outer peripheral surface of the stator and the inner peripheral surface of the tubular portion of the motor frame, an electric power steering motor device is increased in size.

The present invention has been made to solve the problem described above, and has an object to provide a rotating electric machine capable of suppressing vibrations generated at the time of driving and achieving downsizing.

Solution to Problem

According to one embodiment of the present invention, there is provided a rotating electric machine, including: a rotor; a stator including a stator core provided on an outer side with respect to the rotor in a radial direction of the rotor; a motor frame, which includes a tubular portion provided on an outer side with respect to the stator core in the radial direction, and has the stator fixed thereto; and an intermediate member, which is provided on an outer peripheral surface of the stator core in the radial direction, and is held in a state of being press-fitted to an inner peripheral surface of the tubular portion in the radial direction, wherein a stiffness of the intermediate member per unit length is higher than a stiffness of the tubular portion per unit length.

Advantageous Effects of Invention

In the rotating electric machine according to the present invention, the intermediate member is provided on the outer peripheral surface of the stator in the radial direction under the state in which the intermediate member is press-fitted to the inner peripheral surface of the tubular portion. With such a configuration, a tightening force exerted on the stator core in the radial direction is improved. As a result, vibrations generated in the rotating electric machine at the time of driving of the rotating electric machine can be suppressed. Moreover, according to the rotating electric machine, a stiffness of the intermediate member per unit length is higher than a stiffness of the tubular portion per unit length. With this, a plate thickness of the tubular portion of the motor frame can be reduced. As a result, downsizing of the rotating electric machine can be achieved.

DESCRIPTION OF EMBODIMENTS

First Embodiment

Figure 1:
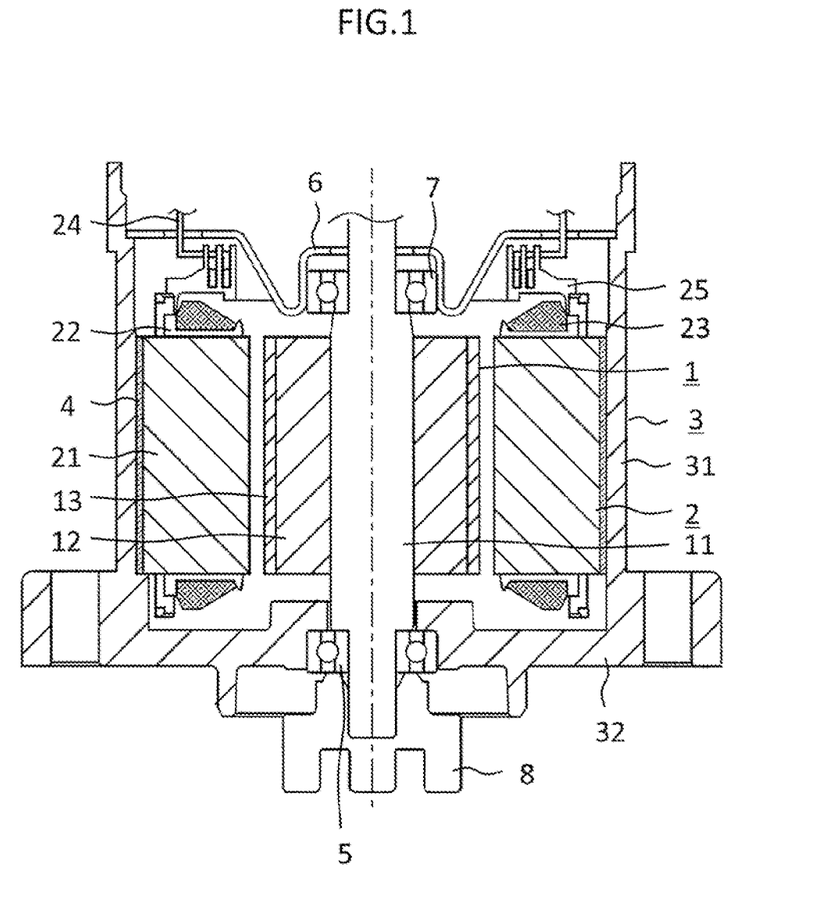
FIG. 1 is a vertical sectional view for illustrating an electric power steering motor device according to a first embodiment of the present invention.

FIG. 1 is a vertical sectional view for illustrating an electric power steering motor device according to a first embodiment of the present invention. The electric power steering motor device is described as an example of the rotating electric machine. The electric power steering motor device mainly includes a motor portion and an electronic control unit (not shown) configured to control the motor portion. The motor portion is configured to assist a steering effort of a steering portion of a vehicle. The electronic control unit is hereinafter abbreviated as "ECU" (electronic control unit). In FIG. 1, an illustration of the ECU is omitted.

The motor portion includes a rotor 1 and a stator 2. The stator 2 is provided on an outer side with respect to the rotor 1 in a radial direction of the rotor 1. Moreover, the motor portion includes a motor frame 3 and an intermediate member 4. The motor frame 3 is provided on an outer side with respect to the stator 2 in the radial direction of the rotor 1. The intermediate member 4 is provided between the stator 2 and the motor frame 3. In this example, the radial direction corresponds to the radial direction of the rotor 1.

The rotor 1 includes a shaft 11, a rotor core 12, and a plurality of magnets 13. The shaft 11 serves as a center of rotation. The rotor core 12 is fixed to an outer peripheral surface of the shaft 11 in the radial direction. The plurality of magnets 13 are joined to the rotor core 12.

The stator 2 includes a stator core 21, insulators 22, and a plurality of coils 23. The insulators 22 are provided on the stator core 21. The plurality of coils 23 are supported on the stator core 21 through intermediation of the insulators 22. The stator core 21 is provided on an outer side with respect to the rotor 1 in the radial direction. The stator core 21 is formed of a plurality of electromagnetic steel sheets laminated on one another.

Moreover, the stator 2 includes terminals 24 and a holder 25. The terminals 24 receive currents fed from the ECU. The holder 25 is fixed to the motor frame 3, and has the terminals 24 fixed thereto. The terminals 24 are electrically connected to the coils 23, respectively.

The motor frame 3 is configured to protect the stator 2. The motor frame 3 includes a tubular portion 31 and a bottom plate portion 32. The tubular portion 31 is provided on an outer side with respect to the stator core 21 in the radial direction. The bottom plate portion 32 is provided at one end portion of the tubular portion 31 in an axial direction of the rotor 1. The tubular portion 31 and the bottom plate portion 32 are formed integrally with each other. The motor frame 3 is made of an aluminum-based material. In this example, the axial direction corresponds to the axial direction of the rotor 1.

The intermediate member 4 has an annular shape, and has a cylindrical shape extending in the axial direction. The intermediate member 4 is provided on an outer peripheral surface of the stator core 21 in the radial direction. Moreover, the intermediate member 4 is press-fitted to an inner peripheral surface of the tubular portion 31 in the radial direction. That is, the intermediate member 4 is provided on the outer peripheral surface of the stator core 21 under a state in which the intermediate member 4 is press-fitted to the inner peripheral surface of the tubular portion 31. The stator core 21 is press-fitted to an inner peripheral surface of the intermediate member 4 in the radial direction.

A dimension of the intermediate member 4 in the axial direction and a dimension of the stator core 21 in the axial direction match each other. The intermediate member 4 is provided so as to cover an entire region in the axial direction with respect to the outer peripheral surface of the stator core 21 in the radial direction.

Examples of a method of placing the intermediate member 4 between the stator core 21 and the tubular portion 31 include a method of press-fitting the intermediate member 4 to the inner peripheral surface of the tubular portion 31 in the radial direction and thereafter press-fitting the stator core 21 to the inner peripheral surface of the intermediate member 4 in the radial direction. Moreover, examples of the method of placing the intermediate member 4 between the stator core 21 and the tubular portion 31 include a method of press-fitting the stator core 21 to the inner peripheral surface of the intermediate member 4 in the radial direction and thereafter press-fitting the intermediate member 4 to the inner peripheral surface of the tubular portion 31 in the radial direction.

Moreover, the motor portion further includes a bearing 5, a bearing holder 6, and a bearing 7. The bearing 5 is provided at the bottom plate portion 32. The bearing holder 6 is provided at the tubular portion 31. The bearing 7 is provided at the bearing holder 6. The rotor core 12 and the stator core 21 are provided between the bottom plate portion 32 and the bearing holder 6 in the axial direction. The bearing 5 and the bearing 7 rotatably support the shaft 11.

A rotation angle sensor (not shown) is provided to the shaft 11. The rotation angle sensor is configured to detect a rotation angle of the shaft 11. Examples of the rotation angle sensor include a resolver, a Hall integrated circuit (IC), and a magnetoresistive (MR) sensor.

Moreover, the motor portion further includes a boss 8 provided at a distal end portion of the shaft 11. The boss 8 receives a vehicle-side portion assembled thereto.

The stator core 21 typically has an annular shape. Therefore, through feeding of currents through the coils 23, in principle, an electromagnetic excitation force which deforms the annular shape into an oval shape is generated in the stator core 21. Thus, with regard to the electric power steering motor device, there is an issue of reducing vibrations generated in the stator core 21 and noises generated by the vibrations. In the electric power steering motor device according to the first embodiment, the stator core 21 is press-fitted to the inner peripheral surface of the intermediate member 4. With this, the stator core 21 is tightened by the intermediate member 4 from the outer side toward the inner side in the radial direction. Thus, the deformation of the stator core 21 by the electromagnetic excitation force is suppressed. As a result, the vibrations generated in the electric power steering motor device and the noises generated by the vibrations are reduced.

A linear expansion coefficient of the intermediate member 4 and a linear expansion coefficient of the stator core 21 are equal to each other. With this, in a case in which the electric power steering motor device is driven, when a temperature change occurs in the electric power steering motor device, a change in interference between the intermediate member 4 and the stator core 21 is suppressed. As a result, a tightening force exerted on the stator core 21 by the intermediate member 4 is maintained. Thus, the suppression of the deformation of the stator core 21 is maintained. As a result, in the case in which the electric power steering motor device is driven, when the temperature change occurs in the electric power steering motor device, the reduction of the vibrations generated in the electric power steering motor device and the noises generated by the vibrations is maintained.

The intermediate member 4 is press-fitted to the inner peripheral surface of the tubular portion 31 of the motor frame 3. With this, the tightening force exerted on the stator core 21 from the outer side toward the inner side in the radial direction becomes stronger.

As a method of increasing the tightening force exerted on the stator core 21 from the outer side toward the inner side in the radial direction, it is conceivable to increase a plate thickness of the tubular portion 31 of the motor frame 3. The increase in plate thickness of the tubular portion 31 increases a stiffness of the tubular portion 31. However, the increase in plate thickness of the tubular portion 31 may cause a problem in that a dimension of the electric power steering motor device in the radial direction increases. The electric power steering motor device is onboard equipment. Thus, there is limitation on the electric power steering motor device in terms of mountability. That is, importance is given on downsizing of the electric power steering motor device. As a result, the increase in dimension of the electric power steering motor device in the radial direction may pose a significant demerit.

In consideration of a stiffness of a structure provided on the outer side of the stator core 21 in the radial direction in a simple manner, the stiffness of the structure is obtained by the expression of $E \times I$. In this expression, "E" represents a Young's modulus, and "I" represents geometrical moment of inertia.

In the electric power steering motor device according to the first embodiment, the intermediate member 4 and the tubular portion 31 are provided on the outer side of the stator core 21 in the radial direction. A value of the stiffness of the structure provided on the outer side of the stator core 21 in the radial direction corresponds to a sum total value of the stiffness of the intermediate member 4 and the stiffness of the tubular portion 31. When the Young's modulus E of any one of the intermediate member 4 and the tubular portion 31 is set higher, the geometrical moment of inertia of the intermediate member 4 and the tubular portion 31 can be reduced correspondingly.

In the electric power steering motor device according to the first embodiment, the stiffness of the intermediate member 4 per unit length is higher than the stiffness of the tubular portion 31 per unit length. With this, the geometrical moment of inertia of the tubular portion 31 can be reduced. As a result, the plate thickness of the tubular portion 31 can be reduced. Thus, downsizing of the electric power steering motor device can be achieved. Examples of a material having a higher stiffness per unit length include an iron-based material and an SUS material.

When the stator core 21 is a segmented core divided into a plurality of portions in a circumferential direction, the stiffness of the stator core 21 is lower as compared to the case in which the stator core 21 is an integrated core which is not divided into a plurality of portions in the circumferential direction. However, the intermediate member 4 tightens the stator core 21 from the outer side toward the inner side in the radial direction. With this, the stiffness of the stator 2 is set higher. As a result, the vibrations generated in the electric power steering motor device and the noises generated by the vibrations are reduced.

The stator core 21 is formed of a plurality of electromagnetic steel sheets laminated on one another. Therefore, in the case in which the stator core 21 is press-fitted to the inner peripheral surface of the tubular portion 31 of the motor frame 3, when a step is formed on the outer peripheral surface of the stator core 21, there is a risk in that damage such as shaving occurs on the motor frame 3. In particular, when a hardness of the stator core 21 is higher than a hardness of the motor frame 3, the risk of causing damage on motor frame 3 is higher. Therefore, in the related art, shrink fitting is adopted when the stator core 21 is press-fitted to the inner peripheral surface of the tubular portion 31 of the motor frame 3. However, the shrink fitting increases cost for equipment. As a result, there is a problem in that the manufacturing cost for the electric power steering motor device increases.

In the electric power steering motor device according to the first embodiment, the intermediate member 4 is provided between the stator core 21 and the tubular portion 31 of the motor frame 3. With this, as a material of the motor frame 3, there is used an aluminum-based material having a hardness lower than that of the electromagnetic steel sheets used for the stator core 21. As a result, reduction in overall weight of the electric power steering motor device can be achieved.

As described above, according to the electric power steering motor device of the first embodiment of the present invention, the intermediate member 4 is provided on the outer peripheral surface of the stator 2 in the radial direction under the state in which the intermediate member 4 is press-fitted to the inner peripheral surface of the tubular portion 31. With this, the tightening force exerted on the stator core 21 in the radial direction is improved. As a result, the vibrations generated in the electric power steering motor device at the time of driving of the electric power steering motor device and the noises generated by the vibrations can be suppressed. Moreover, according to the electric power steering motor device, the stiffness of the intermediate member 4 per unit length is higher than the stiffness of the tubular portion 31 per unit length. With this, even when the plate thickness of the tubular portion 31 of the motor frame 3 is reduced, an appropriate stiffness can be obtained as a whole. As a result, downsizing of the electric power steering motor device can be achieved.

Moreover, the linear expansion coefficient of the intermediate member 4 is equal to the linear expansion coefficient of the stator core 21. With this, even when the temperature change occurs in the electric power steering motor device, suppression of deformation of the stator core 21 can be maintained.

Moreover, the motor frame 3 is made of an aluminum-based material. With this, reduction in overall weight of the electric power steering motor device can be achieved.

Second Embodiment

Figure 2:
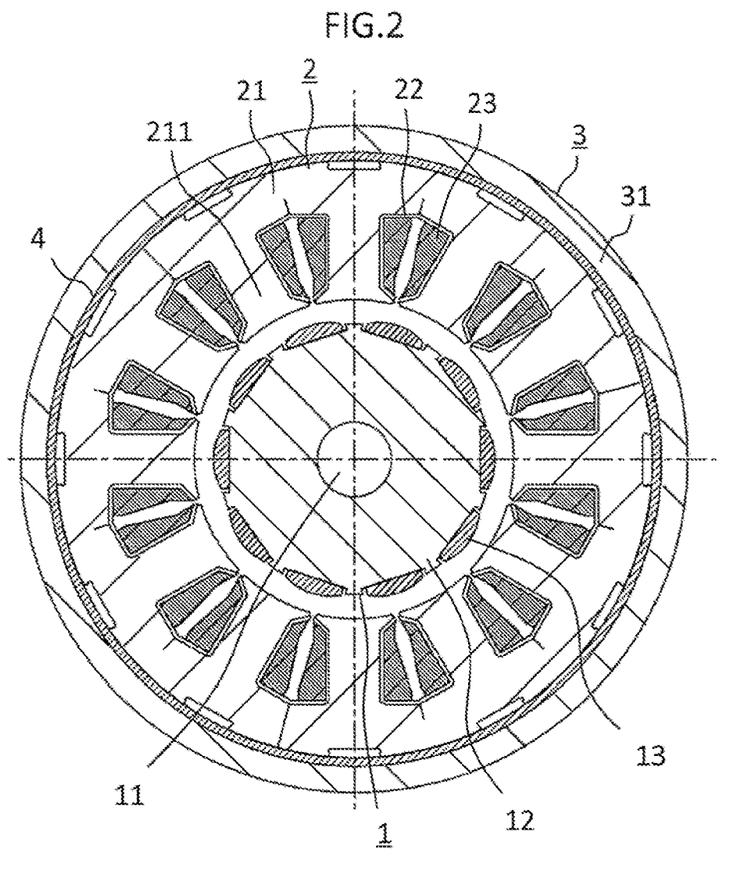
FIG. 2 is a sectional view for illustrating an electric power steering motor device according to a second embodiment of the present invention.

FIG. 2 is a sectional view for illustrating an electric power steering motor device according to a second embodiment of the present invention. The stator core 21 includes twelve teeth 211. The twelve teeth 211 are arranged at equal intervals in the circumferential direction. The rotor 1 includes ten magnets 13. The ten magnets 13 are magnetized so that N poles and S poles are alternately arranged in the circumferential direction. In this electric power steering motor device, the number of poles is ten, and the number of slots is twelve. The coils 23 are provided to the twelve teeth 211, respectively. The twelve coils 23 are arranged so that each pair of coils 23 located at positions apart from each other by a mechanical angle of 180 degrees have the same phase. In other words, the twelve coils 23 are arranged so that each of the pairs of coils 23 located at opposed positions have the same phase. In this example, the number of slots is twelve. Thus, each of the pairs of coils 23 apart from each other by six slots in the circumferential direction have the same phase.

In the electric power steering motor device according to the second embodiment, the number of poles is ten, and the number of slots is twelve. With this, a winding factor with respect to a fundamental wave is large, and a winding factor with respect to a higher harmonic wave is small. Thus, occurrence of torque ripple can be reduced while generating a large torque with a smaller amount of magnets. As a result, an electric power steering motor device exhibiting a high performance can be supplied with less cost. However, in the electric power steering motor device having the combination of ten poles and twelve slots and the above-mentioned arrangement of the coils 23, in principle, an electromagnetic force which causes deformation of the shape of the stator core 21 from the annular shape to the oval shape is generated. Thus, the stator core 21 is liable to be deformed into the oval shape, and the amount of deformation of the stator core 21 is liable to be large.

In the electric power steering motor device according to the second embodiment, a sum total value of a stiffness value of the tubular portion 31 of the motor frame 3 and a stiffness value of the intermediate member 4 corresponds to a stiffness value of the member which tightens the stator core 21 from the outer side toward the inner side in the radial direction. With this, as compared to the case in which only the motor frame 3 tightens the stator core 21 from the outer side toward the inner side in the radial direction, the stiffness of the stator core 21 becomes higher. As a result, the deformation of the stator core 21 into the oval shape is suppressed. Thus, the vibrations of the electric power steering motor device being a demerit can be suppressed while utilizing the merit of the electric power steering motor device with ten poles and twelve slots. Other configurations are the same as those of the first embodiment.

As described above, according to the electric power steering motor device of the second embodiment of the present invention, the number of slots of the stator 2 is twelve, and the number of poles of the rotor 1 is ten. With this, the electric power steering motor device exhibiting a high performance can be supplied with less cost, and the vibrations of the electric power steering motor device can be suppressed.

Third Embodiment

Figure 3:
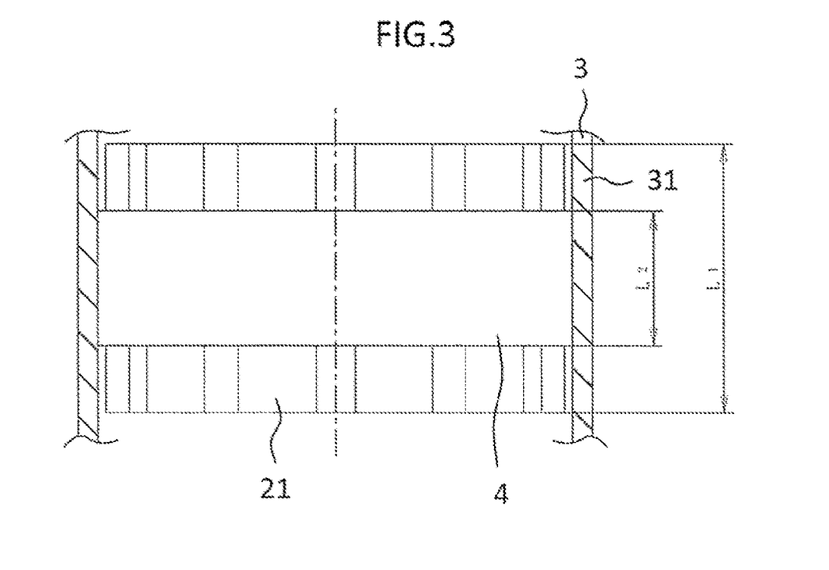
FIG. 3 is a side view for illustrating a stator core, an intermediate member, and a motor frame of an electric power steering motor device according to a third embodiment of the present invention.

FIG. 3 is a side view for illustrating a stator core, an intermediate member, and a motor frame of an electric power steering motor device according to a third embodiment of the present invention. In FIG. 3, the motor frame 3 is illustrated in sectional view. When a length of the stator core 21 in the axial direction is represented by $L_1$, and a length of the intermediate member 4 in the axial direction is represented by $L_2$, a relationship between $L_1$ and $L_2$ satisfies $L_1/2 < L_2 < L_1$.

The main factor for suppressing the vibrations of the stator core 21 is to tighten the stator core 21 from the outer side toward the inner side in the radial direction. Thus, a dimension of the intermediate member 4 in the axial direction can be reduced. The effect of suppressing the vibrations of the stator core 21 has been confirmed by experiment. Therefore, the amount of use of the intermediate member 4 can be reduced. As a result, reduction in weight of the electric power steering motor device can be achieved. Other configurations are the same as those of the first embodiment or the second embodiment.

As described above, according to the electric power steering motor device of the third embodiment of the present invention, when the length of the stator core 21 in the axial direction is represented by $L_1$, and the length of the intermediate member 4 in the axial direction is represented by $L_2$, $L_1/2 < L_2 < L_1$ is satisfied. Thus, reduction in weight of the electric power steering motor device can be achieved.

Fourth Embodiment

Figure 4:
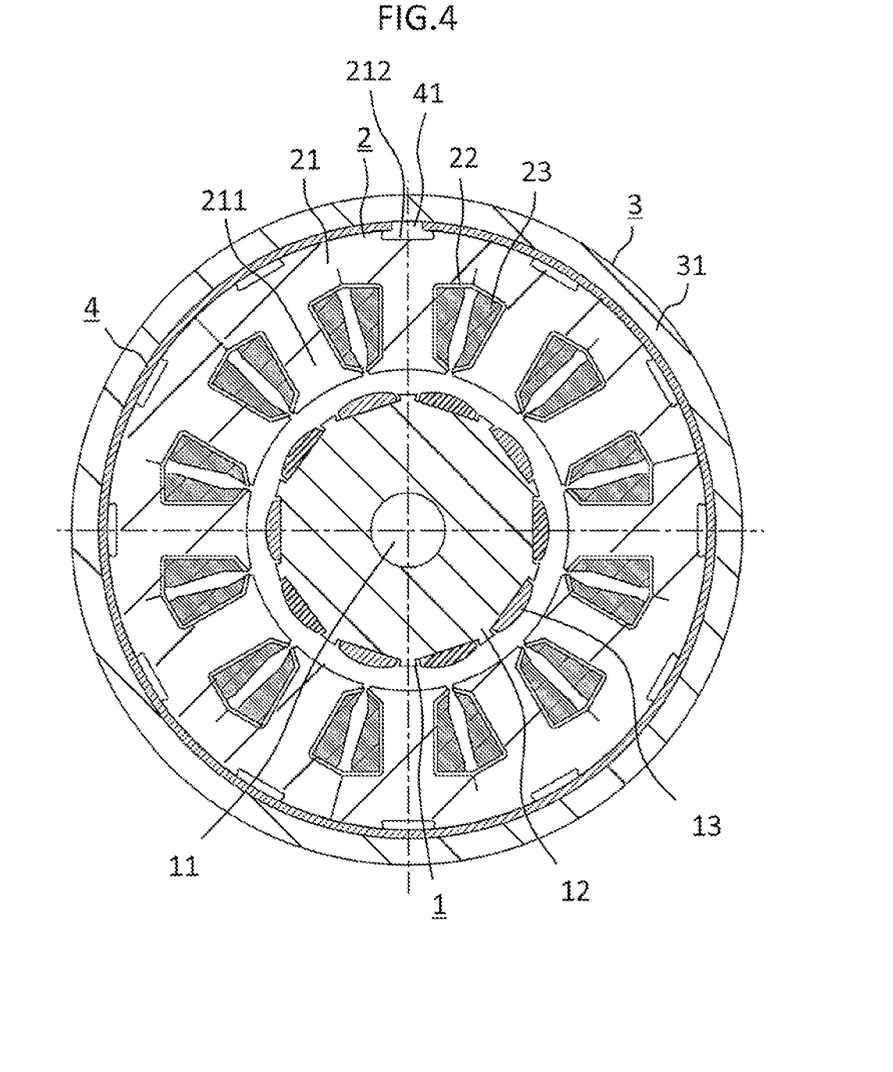
FIG. 4 is a sectional view for illustrating an electric power steering motor device according to a fourth embodiment of the present invention.
Figure 5:
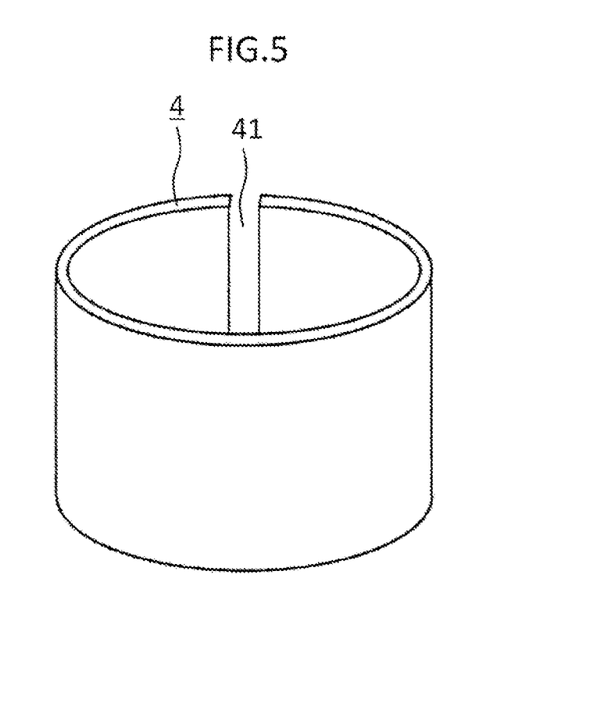
FIG. 5 is a perspective view for illustrating an intermediate member of FIG. 4.

FIG. 4 is a sectional view for illustrating an electric power steering motor device according to a fourth embodiment of the present invention. FIG. 5 is a perspective view for illustrating an intermediate member of FIG. 4. The intermediate member 4 has a C shape and is formed into a shape extending in the axial direction. In other words, the intermediate member 4 has a C shape which is obtained by forming a cutout portion 41 in the annular shape.

The intermediate member 4 is press-fitted to the inner peripheral surface of the tubular portion 31 of the motor frame 3. Moreover, the stator core 21 is press-fitted to the inner peripheral surface of the intermediate member 4. Even when the intermediate member 4 has a C shape rather than the annular shape, the intermediate member 4 tightens the stator core 21 from the outer side toward the inner side in the radial direction. With this, the deformation of the stator core 21 by the electromagnetic excitation force is suppressed. As a result, the vibrations generated in the electric power steering motor device and the noises generated by the vibrations are reduced.

The intermediate member 4 has a C shape. With this, when the intermediate member 4 is press-fitted to the inner peripheral surface of the tubular portion 31 of the motor frame 3, a load can be applied to the intermediate member 4 in a direction in which the dimension of the intermediate member 4 is reduced in the radial direction. Thus, a press-fitting force required at the time of press-fitting the intermediate member 4 to the inner peripheral surface of the tubular portion 31 can be reduced. As a result, assembly of the electric power steering motor device can easily be performed.

The outer peripheral surface of the stator core 21 has a plurality of recessed portions 212 arranged in the circumferential direction. The recessed portions 212 are arranged so as to be adjacent to the teeth 211 in the radial direction. The cutout portion 91 of the intermediate member 4 is arranged so as to be adjacent to the recessed portion 212 in the radial direction. With this, when the intermediate member 4 is press-fitted to the tubular portion 31 of the motor frame 3, both end portions of the intermediate member 4 forming the cutout portion 41 in the circumferential direction can escape toward the inner side in the radial direction. As a result, damage on the tubular portion 31 of the motor frame 3 and the stator core 21 can be suppressed. Other configurations are the same as those of any one of the first to third embodiments.

As described above, according to the electric power steering motor device of the fourth embodiment of the present invention, the intermediate member 4 has a C shape. With this, assembly of the electric power steering motor device can easily be performed.

Moreover, the cutout portion 41 of the intermediate member 4 is formed so as to be adjacent to the recessed portion 212 in the radial direction. With this, when the intermediate member 4 is press-fitted to the tubular portion 31 of the motor frame 3, damage on the tubular portion 31 of the motor frame 3 and the stator core 21 can be suppressed.

Fifth Embodiment

Figure 6:
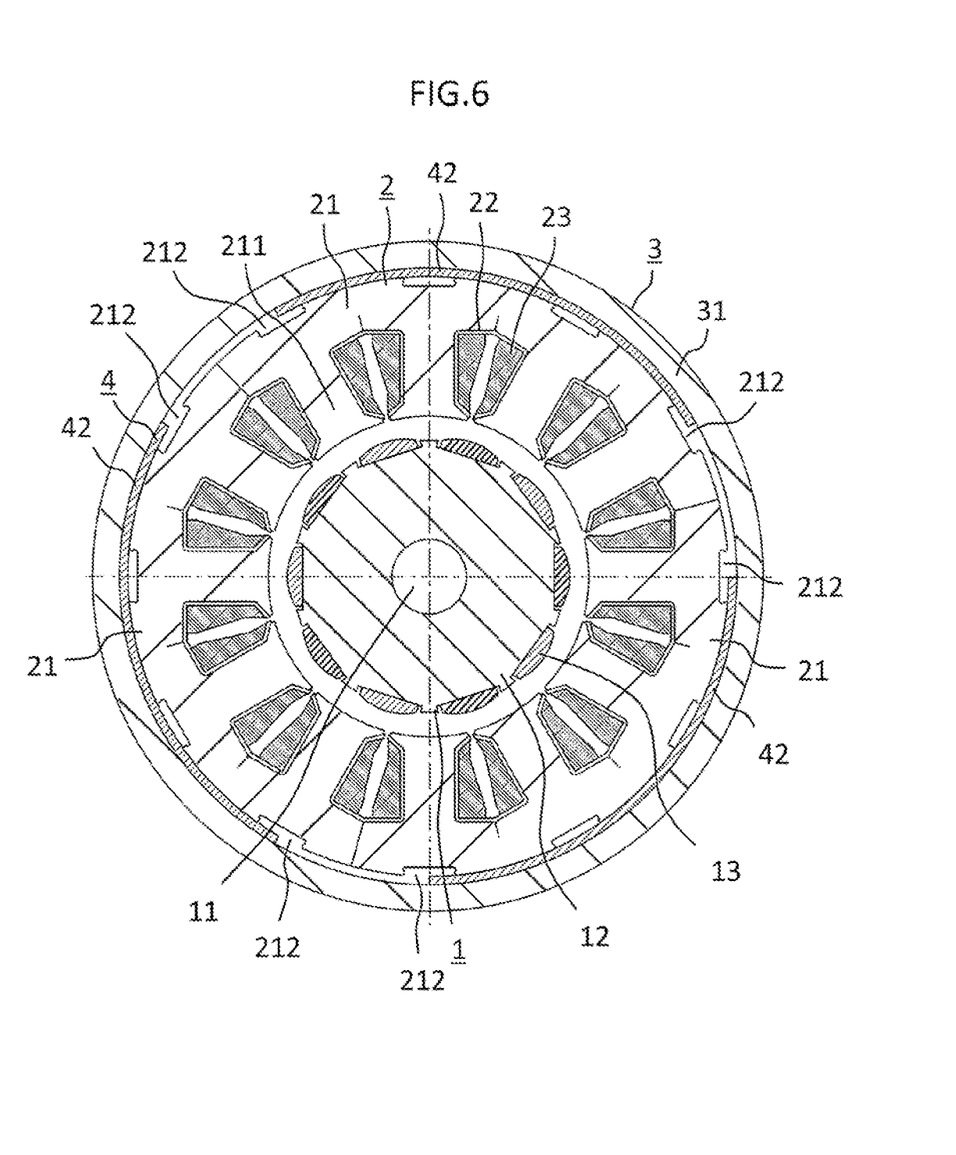
FIG. 6 is a sectional view for illustrating an electric power steering motor device according to a fifth embodiment of the present invention.
Figure 7:
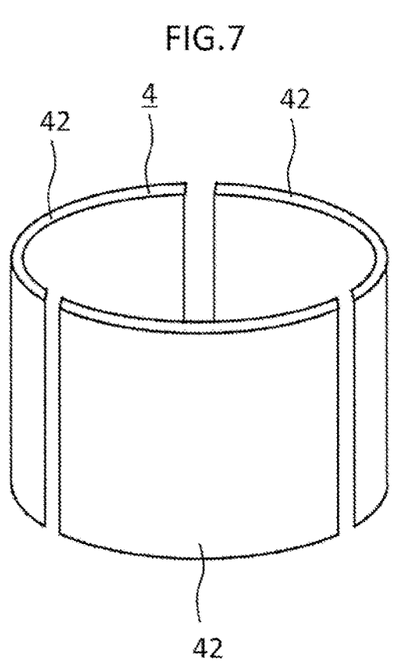
FIG. 7 is a perspective view for illustrating an intermediate member of FIG. 6.

FIG. 6 is a sectional view for illustrating an electric power steering motor device according to a fifth embodiment of the present invention. FIG. 7 is a perspective view for illustrating an intermediate member of FIG. 6. The stator core 21 is divided into a plurality of segments in the circumferential direction. In this example, the stator core 21 is divided into three segments.

The intermediate member 4 includes a plurality of tile-shaped members 42 arranged in the circumferential direction. The number of the tile-shaped members 42 is equal to the number of the segments of the stator cores 21. In this case, the number of the tile-shaped members 42 is three.

With the intermediate member 4 being formed of the plurality of tile-shaped members 42, the weight of the intermediate member 4 can be reduced. With this, reduction in weight of the electric power steering motor device can be achieved.

With the tile-shaped member 42 being press-fitted to the inner peripheral surface of the tubular portion 31 of the motor frame 3, the stator core 21 is tightened from the outer side toward the inner side in the radial direction.

End portions of each of the tile-shaped members 42 in the circumferential direction are arranged so as to be adjacent to the recessed portions 212 in the radial direction. With this, when the intermediate member 4 is press-fitted to the tubular portion 31, the end portions of each of the tile-shaped members 42 in the circumferential direction escape to the recessed portions 212. As a result, damage on the tubular portion 31 of the motor frame 3 and the stator core 21 is suppressed. Other configurations are the same as those of any one of the first to third embodiments.

As described above, according to the electric power steering motor device of the fifth embodiment of the present invention, the end portions of each of the tile-shaped member 42 in the circumferential direction are arranged so as to be adjacent to the recessed portions 212 in the radial direction. With this, when the intermediate member 4 is press-fitted to the inner peripheral surface of the tubular portion 31, damage on the tubular portion 31 and the stator core 21 can be suppressed.

In each of the embodiments described above, the electric power steering motor device is described as an example of the rotating electric machine. However, the present invention may be applicable to any other rotating electric machine.

REFERENCE SIGNS LIST 1 rotor, 2 stator, 3 motor frame, 4 intermediate member, 5 bearing, 6 bearing holder, 7 bearing, 8 boss, 11 shaft, 12 rotor core, 13 magnet, 21 stator core, 22 insulator, 23 coil, 24 terminal, 25 holder, 31 tubular portion, 32 bottom plate portion, 41 cutout portion, 42 tile-shaped member, 211 teeth, 212 recessed portion

The invention claimed is:

1. A rotating electric machine, comprising:
a rotor; a stator including a stator core provided on an outer side with respect to the rotor in a radial direction of the rotor;
a motor frame, which includes a tubular portion provided on an outer side with respect to the stator core in the radial direction, and has the stator fixed thereto; and
an intermediate member, which is provided on an outer peripheral surface of the stator core in the radial direction, and is held in a state of being press-fitted to an inner peripheral surface of the tubular portion in the radial direction,
wherein a stiffness of the intermediate member per unit length is higher than a stiffness of the tubular portion per unit length,
wherein the intermediate member has a C shape which is obtained by forming a cutout portion in an annular shape such that an axial center of the intermediate member coincides with an axial center of the stator core,
wherein an outer peripheral surface of the stator core has a recessed portion, and
wherein the recessed portion is arranged so as to be opposed to the cutout portion.

2. The rotating electric machine according to claim 1, wherein a linear expansion coefficient of the intermediate member is equal to a linear expansion coefficient of the stator core.

3. The rotating electric machine according to claim 1, wherein the motor frame is made of an aluminum-based material.

4. The rotating electric machine according to claim 1, wherein the number of slots of the stator is twelve, and the number of poles of the rotor is ten.

5. The rotating electric machine according to claim 1, wherein when a length of the stator core in an axial direction of the rotor is $L_1$, and a length of the intermediate member in the axial direction is $L_2$, $L_1/2 < L_2 < L_1$ is satisfied.

6. A rotating electric machine, comprising:
a rotor;
a stator including a stator core provided on an outer side with respect to the rotor in a radial direction of the rotor;
a motor frame, which includes a tubular portion provided on an outer side with respect to the stator core in the radial direction, and has the stator fixed thereto; and
an intermediate member, which is provided on an outer peripheral surface of the stator core in the radial direction, and is held in a state of being press-fitted to an inner peripheral surface of the tubular portion in the radial direction,
wherein a stiffness of the intermediate member per unit length is higher than a stiffness of the tubular portion per unit length,
wherein the intermediate member includes a plurality of tile-shaped members arranged in a circumferential direction of the rotor,
wherein an outer peripheral surface of the stator core has a plurality of recessed portions arranged in the circumferential direction, and
wherein end portions of each of the plurality of tile-shaped members in the circumferential direction are arranged so as to be adjacent to the plurality of recessed portions in the radial direction.

* * * * *